(12) United States Patent
Reuther et al.

(10) Patent No.: US 12,187,654 B2
(45) Date of Patent: Jan. 7, 2025

(54) METHOD FOR PRODUCING A DECORATIVE MINERAL COMPOSITE BODY

(71) Applicant: LEONHARD KURZ Stiftung & Co. KG, Fürth (DE)

(72) Inventors: Uwe Reuther, Nuremberg (DE); Roman Lasch, Fürth (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 848 days.

(21) Appl. No.: 17/283,576

(22) PCT Filed: Sep. 5, 2019

(86) PCT No.: PCT/EP2019/073725
§ 371 (c)(1),
(2) Date: Apr. 8, 2021

(87) PCT Pub. No.: WO2020/074188
PCT Pub. Date: Apr. 16, 2020

(65) Prior Publication Data
US 2021/0340068 A1    Nov. 4, 2021

(30) Foreign Application Priority Data
Oct. 12, 2018   (DE) .......... 102018125312.5

(51) Int. Cl.
*C04B 41/00*   (2006.01)
*B44C 1/17*    (2006.01)
(Continued)

(52) U.S. Cl.
CPC ........ *C04B 41/4501* (2013.01); *B44C 1/1733* (2013.01); *B44C 5/0438* (2013.01);
(Continued)

(58) Field of Classification Search
CPC ............. C04B 41/4501; C04B 41/4511; C04B 41/474; C04B 41/483; B44C 1/1733; B44C 5/0438; B44C 5/0453
See application file for complete search history.

(56) References Cited

U.S. PATENT DOCUMENTS 5,053,260 A    10/1991   Brehm
5,541,251 A    7/1996    Bontinck et al.
(Continued)

FOREIGN PATENT DOCUMENTS

CN    102470581 A    5/2012
CN    105431302 A    3/2016
(Continued)

OTHER PUBLICATIONS

PCT International Search Report and Written Opinion corresponding to Application No. PCT/EP2019/073725, dated Nov. 7, 2019.
(Continued)

*Primary Examiner* — Thu Khanh T. Nguyen
(74) *Attorney, Agent, or Firm* — Hoffmann & Baron, LLP (57) ABSTRACT

A method for producing a decorated mineral composite body, a decorated mineral composite body and the use of a multilayer film for producing a decorated mineral composite body.

18 Claims, 5 Drawing Sheets

(51) Int. Cl.
- *B44C 5/04* (2006.01)
- *C04B 28/02* (2006.01)
- *C04B 41/45* (2006.01)
- *C04B 41/47* (2006.01)
- *C04B 41/48* (2006.01)
- *C04B 111/60* (2006.01)

(52) U.S. Cl.
CPC ............ *B44C 5/0453* (2013.01); *C04B 28/02* (2013.01); *C04B 41/009* (2013.01); *C04B 41/4511* (2013.01); *C04B 41/474* (2013.01); *C04B 41/483* (2013.01); *C04B 2111/60* (2013.01)

(56) References Cited

U.S. PATENT DOCUMENTS

| | | | |
|---|---|---|---|
| 10,576,672 | B2 | 3/2020 | Schmidt et al. |
| 10,926,571 | B2 | 2/2021 | Brehm et al. |
| 11,046,107 | B2 | 6/2021 | Gourdin et al. |
| 11,260,567 | B2 | 3/2022 | Fuchs et al. |
| 2005/0064249 | A1* | 3/2005 | Apitz .................... C04B 41/71 427/372.2 |
| 2011/0184088 | A1 | 7/2011 | Lohmeijer et al. |
| 2020/0001647 | A1 | 1/2020 | Reuther et al. |

FOREIGN PATENT DOCUMENTS

| | | |
|---|---|---|
| CN | 106459619 A | 2/2017 |
| CN | 107835734 A | 3/2018 |
| DE | 2649378 A1 | 5/1977 |
| DE | 69412990 T2 | 1/1999 |
| DE | 102017104658 A1 | 9/2018 |
| EP | 0412492 A2 | 2/1992 |
| EP | 0857767 A1 | 8/1998 |
| EP | 1829699 A1 | 9/2007 |
| EP | 2159204 A1 | 3/2010 |
| EP | 2528978 A1 | 12/2012 |
| GB | 1516784 A | 7/1978 |
| WO | 2003055828 A1 | 7/2003 |
| WO | 2017046308 A2 | 3/2017 |

OTHER PUBLICATIONS

Examination Report on German Application No. 102018125312.5, dated Jul. 22, 2019.

Chinese Office Action, dated Mar. 11, 2022, in the corresponding Chinese Application/Patent No. 201980066227.7.

DIN EN 1992-1-1/A1:Mar. 2015 ("Eurocode 2: Design of concrete structures—Part 1-1: General rules and rules for buildings"; German version EN 1992-1-1:2004/A1:2014, issue date Mar. 2015).

DIN EN 197-1:Nov. 2011 ("Cement—Part 1: Composition, specifications and conformity criteria tor common cements"; German version EN 197-1:2011, issue date Nov. 2011).

DIN 1164-10:Mar. 2013 ("Special cement—Part 10: Composition, specification and conformity evaluation for cement with low effective alkali content", issue date Mar. 2013).

DIN 1164-11:Nov. 2003 ("Special cement—Part 11: Composition, specification and conformity evaluation for cement with short solidification time", issue date Nov. 2003).

DIN EN 459-1:Jul. 2015 ("Building lime—Part 1: Definitions, specifications and conformity criteria", German version EN 459-1:2015, issue date Jul. 2015).

DIN EN 12620:Jul. 2008 ("Aggregates for concrete"; issue date Jul. 2008).

DIN EN 13139:Aug. 2002 ("Aggregates for mortar"; issue date Aug. 2002).

DIN EN ISO 2409: Jun. 2013 (Paints and varnishes—Cross-cut test (ISO 2409:2013), German version of EN ISO 2409:2013, issue date: Jun. 2013).

DIN EN ISO 3681:Oct. 2007 ("Binders for paints and varnishes—Determination of saponification value—Titrimetric method (ISO 3681:1996)"; German version EN ISO 3681:1998, issue date Oct. 2007).

DIN EN ISO 291:Aug. 2008 (Plastics—Standard atmospheres for conditioning and testing (ISO 291:2008)—German version EN ISO 291:2008, issue date: Aug. 2008).

DIN EN ISO 2409: Jun. 2013.

ASTM D 3359-09.

* cited by examiner

| Description | Surface | Characteristic value ISO | Characteristic value ASTM |
|---|---|---|---|
| The edges of the cuts are completely smooth, no section of the coating has flaked. | - | GT 0 | 5B |
| Small flakes of the coating have detached at the intersections of the cut lines; flaked area approximately 5% of the sections. | | GT 1 | 4B |
| The coating has flaked along the edges of the cuts and/or at the intersections of the cut lines; flaked area approximately 15% of the sections. | | GT 2 | 3B |
| The coating has flaked partially or completely in broad strips along the edges of the cuts and/or the coating has flaked completely or partially on individual sections; flaked area approximately 35% of the sections. | | GT 3 | 2B |
| The coating has flaked in broad strips along the edges of the cuts and/or completely or partially on individual sections; flaked area approximately 65% of the sections. | | GT 4 | 1B |
| Flaked area more than 65% of the sections. | - | GT 5 | 0B |

METHOD FOR PRODUCING A DECORATIVE MINERAL COMPOSITE BODY

This application claims priority based on an International Application filed under the Patent Cooperation Treaty, PCT/EP2019/073725, filed Sep. 5, 2019, which claims priority to DE 102018125312.5, filed Oct. 12, 2018.

BACKGROUND OF THE INVENTION

The present invention relates to a method for producing a decorated mineral composite body, a decorated mineral composite body and the use of a multilayer film for producing a decorated mineral composite body.

Mineral construction materials, such as for example concrete, mortar or sand-lime brick, are used for example in the production of buildings, in the construction of tunnels, bridges and retaining walls or foundations or of individual walls, ceilings, supports or ring beams, but also in the production of furniture or works of art.

The weather effects occurring outdoors can in particular lead to an impairment of the durability of mineral construction materials.

For example in Germany, the durability of concrete structures has the status of a legal requirement via the Building Products Act and the state building regulations. This means that stability, fitness for purpose and durability are preferably equally important criteria. According to DIN EN 1992-1-1/A1:2015-03 ("Eurocode 2: Design of concrete structures—Part 1-1: General rules and rules for buildings"; German version EN 1992-1-1:2004/A1:2014, issue date 2015 March) structures are regarded as durable if, during the expected useful life, they perform their function with regard to load-bearing capacity and fitness for purpose without a substantial loss of use properties with an adequate maintenance effort.

The signs of impairment of the durability that are visible on the surface, for example in the case of concrete materials, are the appearance of spalling or flaking, the appearance of cracks and/or visible changes in the structure or the coloration of the surface.

In addition, high demands with regard to the surface condition, texture and/or resistance are made on mineral construction materials which are, for example, not rendered or faced and the visible surfaces of which perform design functions, for example.

SUMMARY OF THE INVENTION

The object of the present invention is therefore to provide a modified mineral construction material which has improved anti-corrosion protection, for example under the action of oxygen, carbon dioxide and/or moisture, and preferably has protection against crack formation.

Furthermore, the method is intended to make a cost-effective protection of the modified mineral construction material possible and where appropriate be suitable for the finishing of mineral construction materials in interior and exterior construction.

The object of the present invention is achieved by the provision of a method for producing a decorated mineral composite body using at least one multilayer film, wherein the method comprises the following steps:
a) providing at least one forming element, preferably formwork, with at least one outer surface and at least one inner surface,
b) applying a flowable or plastically deformable, mineral construction material mixture, which comprises water and at least one mineral binding agent, to the at least one inner surface of the forming element, preferably formwork,
c) at least partially solidifying the mineral construction material mixture to obtain a dimensionally stable, mineral green body, and
d) at least partially hardening the mineral construction material mixture,
wherein the multilayer film has a carrier ply and a transfer ply, which contains at least one decorative element, arranged on the carrier ply,
wherein the transfer ply has at least one anionically functionalized primer layer on the side facing away from the carrier ply, and
wherein I), before step b), the at least one multilayer film is arranged with the side of the carrier ply facing away from the at least one anionically functionalized primer layer on the at least one inner surface of the provided forming element, preferably formwork, and, in step b), the at least one anionically functionalized primer layer is brought into contact, at least partially, with the flowable or plastically deformable, mineral construction material mixture, wherein, in step c), a decorated, dimensionally stable, mineral green body is obtained,
and/or
wherein II), in and/or after step c), the at least one multilayer film is arranged with the at least one anionically functionalized primer layer at least partially on the dimensionally stable, mineral green body, wherein a decorated, dimensionally stable, mineral green body is obtained, and
wherein, in alternatives I) and II), a decorated mineral composite body is obtained after step d).

Preferred embodiments of the method according to the invention are specified below.

The object of the present invention is likewise achieved by the provision of a decorated mineral composite body,
wherein the decorated mineral composite body comprises a mineral substrate and at least one transfer ply, which contains at least one decorative element, at least partially arranged on at least one surface of the substrate,
wherein the side of the transfer ply facing the substrate is formed by at least one anionically functionalized primer layer, which is joined to the mineral substrate in at least a positive-locking manner.

Preferred embodiments of the decorated mineral composite body according to the invention are specified below.

The object of the present invention is furthermore achieved by the provision of a use of a multilayer film for producing a decorated mineral composite body,
wherein the multilayer film has a carrier ply and a transfer ply, which contains at least one decorative element, arranged on the carrier ply,
wherein the transfer ply has at least one anionically functionalized primer layer on the side facing away from the carrier ply.

A multilayer film to be used according to the invention, which can preferably be formed as a transfer film or laminating film, comprises a carrier ply and a transfer ply, which contains at least one decorative element, arranged on the carrier ply, wherein the transfer ply is preferably arranged detachably on the carrier ply when the multilayer film is designed as a transfer film. When the multilayer film is designed as a laminating film, the transfer ply is preferably arranged securely and non-detachably on the carrier ply.

A transfer film to be used according to the invention is preferably used to transfer a transfer ply onto an object, wherein at least one surface of the object is at least partially joined to at least one surface of the transfer ply facing away from the carrier ply, to obtain a decorated object.

After arranging the transfer ply on at least partial areas of the at least one surface of the object, when the multilayer film is designed as a transfer film the carrier ply is preferably removed from the transfer ply, preferably completely, with the result that only the transfer ply is arranged on at least partial areas of the surface of the decorated object, preferably at least partially forms the surface of the decorated object. Preferably, the transfer ply arranged on at least partial areas of the surface of the decorated object forms a further preferably closed coating.

In the process the detachment of the carrier ply from the transfer ply is preferably effected at a layer boundary between the carrier ply and the transfer ply.

A detachment layer which makes it easier to detach the transfer ply from the carrier ply can in particular be arranged at this layer boundary. The detachment layer can be part of the transfer ply and/or part of the carrier film here and be arranged on the transfer ply and/or on the carrier film after the detachment.

When the multilayer film is designed as a laminating film, after arranging the transfer ply on at least partial areas of the at least one surface of the object, the carrier film preferably remains joined to the transfer ply, with the result that the carrier film is arranged on at least partial areas of the surface of the decorated object, preferably at least partially forms the surface of the decorated object. Preferably, the transfer ply arranged on at least partial areas of the surface of the decorated object and the carrier film form a further preferably closed coating.

The multilayer film formed as a laminating film can, for example after arranging the multilayer film on at least partial areas of the at least one surface of the decorated object, make it possible to join two or more objects decorated according to the invention, for example with the aid of joining by forming and/or joining under the influence of heat and/or pressure, wherein two or more adjacent multilayer films can preferably be joined, for example by welding, adhesive bonding, hot stamping, laminating or combinations thereof.

At least one decorative element is transferred onto the object together with the transfer ply, wherein the at least one decorative element is arranged on at least partial areas of the surface of the decorated object after the transfer of the transfer ply and, depending on the design of the at least one decorative element, can influence the physical properties, preferably the haptic and/or the optical and/or the electrical and/or the mechanical properties, and/or the chemical properties of the surface of the decorated object.

For example, the at least one decorative element can influence the surface texture and/or color of the decorated object, for example by providing embossings and/or roughening and/or patterns and/or a smoothness and/or by providing reflection-determining properties such as transparency and/or gloss and/or matting and/or by providing a color.

For example, the at least one decorative element can influence the mechanical properties of the decorated object, for example by providing a surface hardness, surface elasticity and/or breaking strength of the surface. For example, the at least one decorative element can influence the absorbing capacity and/or permeability of the decorated object for water and/or water vapor, for example by providing a water- and/or water vapor-repellent coating.

For example, the at least one decorative element can influence the chemical properties of the decorated object, for example by providing a resistance of the surface to the ingress of substances and/or the action of acids and/or bases. For example, the at least one decorative element can improve the resistance of the decorated object to freeze-thaw cycle stress, for example in the presence of de-icing salt.

The at least one decorative element can preferably be formed as a motif, as a decoration, for example individual image decoration or endless decoration, as a pattern, or a combination thereof.

The at least one decorative element can preferably be opaque and/or translucent and/or transparent, at least in areas.

For example, the at least one decorative element can be formed as an optically active surface structure or one generating optical effects, wherein a suitable surface structure is preferably selected from the group which consists of diffractive surface structure, in particular hologram, zero-order diffraction structure, matte structure, in particular isotropic or anisotropic matte structure, blazed grating, lens structure, microlens structure, microprism structure, micromirror structure, or a combination of two or more of these surface structures.

For example, the at least one decorative element can be formed as an optically active and/or optically variable substance, which are preferably present as a dye, liquid crystal material, pigment, or a mixture thereof. Suitable pigments are, for example, interference layer pigments, liquid crystal pigments, diffractive pigments, metallic pigments, thermochromic pigments, photochromic pigments or mixtures thereof. The substance can display in each case different or also similar optical effects in particular in different wavelength ranges, for example in the infrared range and/or in the ultraviolet range and/or in the visible range. The substance can display in each case different or also similar optical effects in particular also at or in different illumination and/or observation angles or directions.

The decorative element preferably has at least one decorative layer. The decorative element preferably has several decorative layers.

Preferably, the at least one decorative layer comprises or consists of, independently of one another, at least partially arranged, preferably full-surface, protective layers, at least partially arranged barrier layers, at least partially arranged reflective layers, at least partially arranged conductive layers, at least partially arranged adhesion-promoter layers, at least partially arranged adhesive layers, at least partially arranged metal layers, at least partially arranged layers with relief structures, at least partially arranged color layers, at least partially arranged interference layers or combinations thereof.

The at least one decorative layer can preferably be opaque and/or translucent and/or transparent, at least in areas. The decorative layers can, independently of one another, in each case have different degrees of transparency.

Further preferably, the at least one decorative layer is selected from the group which consists of transparent and/or colored varnish layers, in particular comprising one or more dyes and/or pigments, replication layers with a molded optically active surface structure, reflective layers, in particular opaque reflective layers, transparent reflective layers, metallic reflective layers or dielectric reflective layers, optically variable layers, optically active layers, interference multilayer systems, volume hologram layers, liquid crystal layers, in particular cholesteric liquid crystal layers, electrically conductive layers, antenna layers, electrode layers, magnetic layers, magnetic storage layers, barrier layers and combinations thereof.

A mineral construction material is an inorganic nonmetallic construction material consisting of preferably crystalline constituents. These can be natural minerals, such as ashlar, sand or loam, or a shaped mixture of substances consisting of screened or ground minerals, which obtains the desired strength through crystallization of preferably mineral binding agents or mineral binding agent constituents.

In particular, the inventors have found that by finishing a mineral construction material with at least one multilayer film to be used according to the invention the occurrence of corrosion, for example concrete corrosion, can be prevented.

By applying a film coating the decorated mineral construction material in the form of the composite body according to the invention preferably obtains a barrier against oxygen and/or carbon dioxide and/or moisture.

Furthermore, the method according to the invention preferably provides protection from carbonation.

A chemical reaction which takes place in concrete in the presence of carbon dioxide and moisture is preferably called carbonation.

This process does not damage the concrete directly. The strength is preferably even increased by the formation of limestone during the carbonation. In the case of reinforced concrete, however, the loss of the alkaline environment (depassivation) of the reinforcement caused by the process can make corrosion possible, which can result in severe damage to the structural component.

The decorated mineral composite body preferably produced with the method according to the invention has a barrier against acid substances as well as protection from swelling and dissolving attacks.

Concrete substantially consists, for example, of natural stone cemented using cement. Cement stone is, as a basic product, preferably less resistant to acids. Lime-alumina compounds in the cement stone can for example be converted by acids into water-soluble compounds which can be worn away by water and/or atmospheric effects. The cohesion between aggregate and cement stone is preferably initially loosened in the process and in the case of a progressive attack destroyed. So long as the concrete surface is intact, an attack can only start from the surface. The larger the attack surface area with progressive opening and fissuring of the concrete outer skin, the faster the destruction can progress.

In the long term concrete can also be leached by rainwater and other types of very soft water with a hardness of approximately less than 3° dH (German degree of hardness). Lime- and magnesium-deficient water running over the concrete can dissolve calcium hydroxide and wash it out. Then a hydrolytic decomposition of the hydrate phases can be effected.

A swelling attack is present if the substances acting on the concrete form new reaction products with a much larger volume in the reaction with the cement stone, in some cases also with the aggregates. The greater required space can then lead to the concrete blowing out from inside.

A typical example of this is sulfate swelling. If sulfate-containing gases or solutions act on concrete, a reaction between sulfates and the tricalcium aluminate of the cement stone (C3A) can preferably result in the formation of ettringite. In the process, the volume of the reaction products can increase to eight times the original volume of the starting materials and the concrete is blown out from inside. This damage often occurs in the case of concrete sewer tunnels.

Here, under the conditions prevailing above all in deep tunnel systems (low flow rate, relatively high temperature and lack of ventilation), hydrogen sulfide gas smelling of rotten eggs forms due to bacterial decomposition of the sulfur-containing organic substances (such as proteins) contained in the sewage. This gas can be oxidized by other bacteria or by atmospheric oxygen to give sulfates and these can cause the sulfate swelling.

The decorated mineral composite body preferably produced with the method according to the invention preferably furthermore has a barrier against de-icing agents, for example chloride ion-containing de-icing salts.

If chloride ions reach the reinforcement for example, there is a danger of pitting corrosion, in particular for the sensitive prestressing steel. Bridge structures and parking levels, for example, are particularly at risk. The damage processes do not take place on the surface, where they are easy to identify, but rather inside the structural component on the reinforcement through destruction at specific points. At the point in time at which they are identified, they may therefore already have led to severe impairment of the stability.

The method according to the invention for producing a decorated mineral composite body using at least one multilayer film comprises the following steps:
 a) providing at least one forming element, preferably formwork, with at least one outer surface and at least one inner surface,
 b) applying a flowable or plastically deformable, mineral construction material mixture, which comprises water and at least one mineral binding agent, to the at least one inner surface of the forming element, preferably formwork,
 c) at least partially solidifying the mineral construction material mixture to obtain a dimensionally stable, mineral green body, and
 d) at least partially hardening the mineral construction material mixture.

The at least one multilayer film used in the method according to the invention has a carrier ply and a transfer ply, which contains at least one decorative element, arranged on the carrier ply, wherein the transfer ply has at least one anionically functionalized primer layer on the side facing away from the carrier ply,
 wherein I), before step b), the at least one multilayer film is arranged with the side of the carrier ply facing away from the at least one anionically functionalized primer layer on the at least one inner surface of the provided forming element, preferably formwork, and, in step b), the at least one anionically functionalized primer layer is brought into contact, at least partially, with the flowable or plastically deformable, mineral construction material mixture, wherein, in step c), a decorated, dimensionally stable, mineral green body is obtained, and/or
 wherein II), in and/or after step c), the at least one multilayer film is arranged with the at least one anionically functionalized primer layer at least partially on the dimensionally stable, mineral green body, wherein a decorated, dimensionally stable, mineral green body is obtained, and
 wherein, in alternatives I) and II), a decorated mineral composite body is obtained after step d).

In the method according to the invention, the at least one multilayer film is preferably:
 I) arranged, before step b), with the side of the carrier ply facing away from the at least one anionically functionalized primer layer on the at least one inner surface of the provided forming element, preferably formwork, wherein, in step b), the at least one anionically functionalized primer layer of the multilayer film is brought into contact, at least partially, with the flowable or plastically deformable, mineral construction material mixture, wherein, in step c), a decorated, dimensionally stable, mineral green body is obtained, or II) arranged, in and/or after step c), with the side of the at least one anionically functionalized primer layer facing away from the carrier ply on the dimensionally stable, mineral green body, wherein a decorated, dimensionally stable, mineral green body is obtained through the at least partial solidification of the mineral construction material mixture.

In the method according to the invention, at least one first multilayer film and at least one second multilayer film can preferably be used, wherein, before step b), the at least first multilayer film is arranged with the side of the carrier ply of the at least first multilayer film facing away from the at least one anionically functionalized primer layer on the at least one inner surface of the provided forming element, preferably formwork, wherein, in step b), the at least one anionically functionalized primer layer of the at least first multilayer film is brought into contact, at least partially, with the flowable or plastically deformable, mineral construction material mixture, and wherein, in and/or after step c), the at least second multilayer film is arranged with a side of the at least one anionically functionalized primer layer of the at least second multilayer film facing away from the carrier ply on the dimensionally stable, mineral green body, wherein a decorated, dimensionally stable, mineral green body is obtained through the at least partial solidification of the mineral construction material mixture.

Further preferably, in alternative II) of the method according to the invention, before step d), the at least one multilayer film is arranged with the side of the at least one anionically functionalized primer layer facing away from the carrier ply on the dimensionally stable, mineral green body.

Through the method according to the invention a decorated mineral composite body is obtained, preferably in or after step d), which comprises or consists of an at least partially hardened mineral substrate and at least one transfer ply, which contains at least one decorative element, at least partially arranged on at least one surface of the mineral substrate, wherein the side of the transfer ply facing the mineral substrate is formed by at least one anionically functionalized organic primer layer, which is joined to the mineral substrate in at least a positive-locking manner.

The mineral substrate of the decorated mineral composite body preferably comprises or consists of at least one solidified, preferably cured, mineral construction material, optionally at least one aggregate and/or at least one non-volatile additive as well as optionally at least one reinforcement element.

A mineral construction material is preferably an inorganic non-metallic material consisting of at least partially crystalline constituents. These can be natural minerals, such as ashlar, sand, clay or loam, or a shaped mixture of substances consisting of screened and/or ground minerals, which preferably obtains the desired strength in the presence of water through crystallization of at least one mineral binding agent.

In step b) of the method according to the invention, a flowable or plastically deformable, mineral construction material mixture, which comprises water and at least one mineral binding agent, is used which, in step c) of the method according to the invention, at least partially solidifies to obtain a dimensionally stable, mineral green body.

The at least partial solidification of the mineral construction material mixture can also be called setting, wherein the solidification, in particular in the case of cement paste, constitutes the defined increase in viscosity due to water binding, preferably incorporation of water of crystallization, in concrete or mortar.

Through the at least partial solidification of the mineral construction material mixture, a mineral green body which is at least dimensionally stable is preferably obtained. The green body preferably has a lower strength than the at least partially cured mineral composite body.

The strength of mineral construction materials, for example concrete, arises as a result of the, preferably exothermic, reaction in which constituents of the mineral binding agent used crystallize out, for example clinker constituents of cement, preferably with absorption of water. In this process, crystal needles preferably grow, which can become firmly interlocked.

The crystal growth can continue over a relatively long period in the case of a mineral construction material, with the result that the final strength of a mineral composite body is preferably not achieved until after a certain period of time.

For example, cement paste preferably solidifies over a period of twelve hours. Then the hardening phase preferably takes place, wherein cement paste is preferably converted into cement stone in concrete or mortar. With normal temperature and humidity conditions, cement preferably reaches standard strength after 28 days.

The at least one mineral binding agent used in the method according to the invention is preferably selected from the group which consists of calcium silicate hydrates, cement, lime, clay, gypsum, loam, magnesia binder and combinations thereof.

The at least one mineral binding agent preferably comprises or consists of a hydraulic binding agent, a non-hydraulic binding agent or a mixture thereof.

A non-hydraulic binding agent is preferably an inorganic, non-metallic, finely ground substance, which hardens in air after being brought into contact, preferably mixed, with water. Non-hydraulic binding agents are not water-resistant in the hardened state.

A non-hydraulic binding agent is preferably air hardening lime, which hardens in the presence of water with a simultaneous supply of air as the carbon dioxide from the air, with water, forms carbonic acid which is used for the carbonation of the calcium hydroxide (slaked lime).

A further non-hydraulic binding agent is preferably gypsum ($CaSO_4 \times 2\ H_2O$), which can be used as binding agent in the form of hemihydrate ($CaSO_4 \times \frac{1}{2}\ H_2O$) or anhydrite ($CaSO_4$). During the hardening the binding agent absorbs water. In the course of this hydration needle-shaped gypsum crystals of the formula $CaSO_4 \times 2\ H_2O$ form, which become matted with each other and grow together.

A further non-hydraulic binding agent is preferably magnesia binder, which can be produced by mixing caustic calcined magnesite (magnesia, $MgO$) with magnesium chloride ($MgCl_2$) dissolved in water. The hardening is effected by the fine crystal needles of the forming magnesium hydroxide interpenetrating and becoming matted with each other. The hardening is completed in a few hours.

A hydraulic binding agent is preferably an inorganic, non-metallic, finely ground substance which solidifies and hardens by itself after being brought into contact, preferably mixed, with water as a result of chemical reactions with the water and, after the hardening, preferably remains solid and volumetrically stable, even under water.

Hydraulic binding agents consist of compounds between a non-hydraulic base, for example lime (CaO), magnesia (MgO) or mixtures thereof, and so-called hydraulizing substances, for example silicon dioxide ($SiO_2$), aluminum oxide/alumina ($Al_2O_3$), iron oxide ($Fe_2O_3$) or mixtures thereof.

Hydraulic binding agents include, for example, all types of cement according to DIN EN 197-1:2011-11 ("Cement—Part 1: Composition, specifications and conformity criteria for common cements"; German version EN 197-1:2011, issue date 2011 November), DIN 1164-10:2013-03 ("Special cement—Part 10: Composition, specification and conformity evaluation for cement with low effective alkali content", issue date 2013 March) and DIN 1164-11:2003-11 ("Special cement—Part 11: Composition, specification and conformity evaluation for cement with short solidification time", issue date 2003 November) as well as hydraulic lime according to DIN EN 459-1:2015-07 ("Building lime—Part 1: Definitions, specifications and conformity criteria", German version EN 459-1:2015, issue date 2015 July).

Further preferably, the at least one mineral binding agent is selected from the group which consists of Portland cement, Portland blast-furnace slag cement, Portland silicate cement, Portland pozzolana cement, Portland fly ash cement, Portland shale cement, Portland limestone cement, Portland composite cement, blast-furnace slag cement, pozzolanic cement, composite cement, alumina cement and mixtures thereof.

The molar contents of reactive calcium oxide (CaO), silicon dioxide ($SiO_2$) and/or aluminum oxide ($Al_2O_3$), which can form calcium silicate hydrates (CSH) or calcium aluminate hydrates capable of hardening in the presence of water, are preferably decisive for the hydraulic effectiveness of a binding agent.

A hydraulic binding agent preferably contains calcium oxide (CaO) and silicon dioxide ($SiO_2$) in a $CaO/SiO_2$ molar ratio of greater than 1.5.

A latent hydraulic substance contains calcium oxide (CaO) and silicon dioxide ($SiO_2$) in a $CaO/SiO_2$ molar ratio from a range of from 0.5 to 1.5.

Latent hydraulic substances can therefore harden hydraulically only when an activator is added, e.g. calcium hydroxide ($Ca(OH)_2$) or substances with a similar action.

Latent hydraulic substances harden hydraulically by themselves after fine grinding and being brought into contact, preferably mixed, with water because when they react with water without other additions strength-forming, lime-containing hydration products form through hydration.

However, this reaction proceeds very slowly and is therefore preferably accelerated by an activator for technical use. The most important latent hydraulic substance for concrete technology is preferably granulated blast-furnace slag.

As latent hydraulic substances are not binding agents by themselves, they count among concrete additives when used as a starting material of concrete.

Pozzolans are siliceous or siliceous and aluminous substances.

Pozzolans, unlike latent hydraulic substances, contain only a little calcium oxide (CaO). Pozzolans contain calcium oxide (CaO) and silicon dioxide ($SiO_2$) in a $CaO/SiO_2$ molar ratio of less than 0.5.

Pozzolans can therefore form hydration products that are capable of hardening only in conjunction with a substance which, after being brought into contact, preferably mixed, with water, yields calcium hydroxide ($Ca(OH)_2$).

Rocks and earths, which are preferably dried at temperatures of at most approximately 150° C., are called natural pozzolans. They are, like trass, lava, pozzolana and Santorin earth, usually of volcanic origin.

Rocks and earths, which are technically calcined (tempered) at higher temperatures in order to develop a sufficient pozzolanic reactivity, are called artificial or natural tempered pozzolans. Tempered clay, brick dust, silica fume and fly ash can have pozzolanic properties.

Important pozzolans are fly ash, brick dust, silica fume, rice husk ash, clinkstone, calcined clay and metakaolin.

In concrete technology terms, concrete additives also include pozzolans.

The mineral construction material mixture preferably comprises or consists of concrete, mortar, sand-lime brick, ceramic or a combination thereof. By the term "ceramic" is preferably meant silicate ceramic, oxide ceramic, non-oxide ceramic and combinations thereof, preferably silicate ceramic and oxide ceramic.

In a preferred embodiment of the method according to the invention, the mineral construction material mixture comprises concrete or mortar, wherein the at least one mineral binding agent comprises or consists of cement, and wherein the mineral construction material mixture furthermore comprises aggregate.

By the term "aggregate" is preferably meant a mixture of broken or unbroken grains of natural and/or artificial mineral substances of the same or different sizes.

The properties and quality of suitable aggregates for concrete and mortar are specified, for example, by the following standards:

DIN EN 12620:2008-07 ("Aggregates for concrete"; issue date 2008 July),

DIN EN 13139:2002-08 ("Aggregates for mortar"; issue date 2002 August).

Before step b), the at least one multilayer film is preferably arranged with the side of the carrier ply facing away from the at least one anionically functionalized primer layer on at least one formwork inner surface, with the result that the at least one anionically functionalized primer layer of the multilayer film preferably points away from the at least one formwork inner surface.

In step b), the at least one anionically functionalized primer layer of the carrier ply is brought into contact, at least partially, with the flowable mineral construction material mixture, wherein, in step c), through the at least partial solidification of the mineral construction material mixture a decorated, dimensionally stable, mineral green body is obtained, in which the at least one anionically functionalized primer layer of the multilayer film is joined to the at least partially solidified mineral construction material mixture in preferably a positive-locking manner.

After the formwork is removed, a decorated mineral composite body is preferably obtained through at least partial hardening of the mineral construction material mixture.

Concrete is preferably a construction material which is blended as a dispersion with the addition of liquid, preferably water, consisting of a binding agent and aggregates. In some contexts the cured concrete is also called artificial stone.

Concrete preferably contains cement as binding agent and aggregate as ballast. The added water preferably initiates the chemical setting process. In order to influence the processability and further properties of the concrete, concrete additives and/or concrete admixtures can be added to the construction material mixture. The majority of the water is preferably chemically bound.

Preferably, the concrete- or mortar-comprising mineral construction material mixture furthermore contains additives, concrete admixtures, concrete additives and mixtures thereof.

Concrete is preferably used as a composite material in combination with at least one reinforcement element, for example a high-tensile reinforcement. A suitable reinforcement element is for example concrete reinforcement steel or prestressing steel, for example in the form of a mat, rod, wire, ring, lattice girder, or a combination thereof, wherein reinforced concrete or prestressed concrete, respectively, is preferably obtained. Suitable reinforcement elements can likewise be made of steel, synthetic and/or glass fibers as well as knitted fabrics made of alkali-resistant (AR) glass and/or carbon fibers.

Suitable reinforcement elements are known to a person skilled in the art.

Suitable types of concrete are for example: top concrete layer, cast-in-place concrete, pumped concrete, spun concrete, sprayed concrete, tamped concrete, roller compacted concrete, underwater concrete, vacuum concrete, screed concrete, blue concrete, fiber- and textile-reinforced concrete, foam glass concrete, glass-reinforced concrete, high performance and ultra-high performance concrete (UHPC), infra-lightweight concrete and ultra-lightweight concrete, concrete concrete, air-entrained concrete (AE concrete)/foamed concrete, lean concrete, eco concrete, papercrete, polymer concrete and mineral casting, recycled concrete, acid-resistant concrete, self-cleaning concrete, self-compacting concrete (SCC), exposed concrete, structural concrete, textural concrete and photographic concrete, chipping and pervious concrete, reinforced concrete, prestressed concrete, steel fiber-reinforced concrete, translucent concrete (light-transmitting concrete), exposed aggregate concrete, waterproof concrete, fresh concrete, colored concrete, dense structure concrete, porous lightweight concrete, heavyweight concrete/loaded concrete, wood-concrete, carbon concrete, architectural concrete, autoclaved aerated concrete, fiber-reinforced concrete, glass concrete, asphalt concrete, wet mix aggregate, sulfur concrete, resin-based concrete, single-grain concrete, or combinations thereof.

Mortar is preferably a construction material which consists of a binding agent, for example lime or cement, aggregate with a grain size of preferably at most 4 mm and added water, if necessary also of concrete additives and admixtures, and which hardens through a chemical reaction of the binding agents.

Suitable mortars are, for example, masonry mortar, render, fire-resistant mortar, resin-based mortar, screed mortar, grouting mortar, swelling mortar, hydraulic mortar as well as mineral sealing slurries or combinations thereof.

Within the mineral construction materials, a distinction can furthermore be made between preformed construction materials, for example stone or brick, and non-preformed construction materials, for example concrete or mortar.

In the case of preformed construction materials, autoclaved construction materials, such as for example sand-lime brick, autoclaved aerated concrete, fiber cement, CSH insulation material, are used, which contain calcium silicate hydrate (CSH) phases as essential component.

For example, autoclaved aerated concrete is an autoclaved construction material preferably with a bulk density of from 300 kg/m$^3$ to 800 kg/m$^3$, which can preferably be produced from the raw materials quicklime (CaO) as mineral binding agent, water and quartz sand, wherein a small quantity of a pore forming material, preferably aluminum powder or paste, is added. The construction material mixture is preferably poured into a forming element, in which the metallic, fine-particle aluminum generates hydrogen gas in the alkaline suspension.

In the industrial manufacture of sand-lime bricks, quicklime (CaO) and sand (predominantly quartz sand) are preferably mixed with addition of water.

When the quicklime is converted using water, preferably to calcium silicate hydrate, the mixture can in each case preferably be molded by means of pressing to give a dimensionally stable green body.

In a preferred embodiment of the method according to the invention, the mineral construction material mixture comprises or consists of sand-lime brick or autoclaved aerated concrete, wherein the at least one mineral binding agent comprises or consists of a calcium silicate hydrate, wherein, in step c), a dimensionally stable, mineral green body is obtained by means of pressing, wherein, in and/or after step c), the at least one multilayer film is at least partially arranged with the at least one anionically functionalized primer layer on at least one surface of the dimensionally stable, mineral green body, wherein a decorated, dimensionally stable, mineral green body is obtained, and wherein, in step, the decorated, dimensionally stable, mineral green body is hydrothermally hardened, preferably at a temperature from a range of from 150° C. to 250° C. in the presence of steam; preferably with a pressure of at least 5 bar, and for a period of at least 3 h, to obtain a decorated mineral composite body.

In a preferred embodiment of the method according to the invention, the mineral construction material mixture comprises or consists of a ceramic, preferably silicate ceramic, preferably porcelain, oxide ceramic and non-oxide ceramic, preferably silicate ceramic and oxide ceramic, wherein the at least one mineral binding agent comprises or consists of a clay mineral, preferably kaolinite.

Preferably, in step c), a dimensionally stable, mineral green body is obtained by means of pressing, slip casting, injection molding, film casting, modeling and/or extruding, wherein, in and/or after step c), the at least one multilayer film is at least partially arranged with the at least one anionically functionalized primer layer on at least one surface of the dimensionally stable, mineral green body, to obtain a decorated, dimensionally stable, mineral green body.

Preferably, in step d), the decorated, dimensionally stable, mineral green body is fired, preferably at a temperature of 850° C. or higher for a period of at least 12 h, to obtain a decorated mineral composite body.

Further preferably, the at least one multilayer film comprises at least one fireproof decorative element, preferably one or more fireproof pigments and/or one or more molded surface reliefs.

A multilayer film to be used according to the invention has a carrier ply and a transfer ply, which contains at least one of the above-named decorative element, arranged on the carrier ply, wherein the transfer ply has at least one anionically functionalized primer layer on the side facing away from the carrier ply.

Preferably, in the method according to the invention the at least one anionically functionalized primer layer of the multilayer film to be used according to the invention is:

I) in step b), brought into contact, at least partially, with the flowable or plastically deformable, mineral construction material mixture, which comprises water and at least one mineral binding agent, wherein, in step c), a decorated, dimensionally stable, mineral green body is obtained, and/or II) in and/or after step c), at least partially arranged on at least one surface of the dimensionally stable, mineral green body obtained by at least partially solidifying the mineral construction material mixture.

The inventors have found that by at least partially solidifying the mineral construction material mixture a dimensionally stable, mineral green body is formed, which has pores into which the polymers contained in the anionically functionalized primer layer can mechanically "interlock".

The further the solidification of the construction material mixture progresses, i.e. the growth of the needle-shaped calcium silicate hydrate crystals preferably increases, the more the adhesion of the primer layer to the solidified construction material mixture increases. The adhesion preferably correlates with the curing duration, as after one or two days the adhesion is lower than after several days.

The adhesion of the multilayer film and/or of the transfer ply of the multilayer film to the solidified construction material mixture or the composite body according to the invention can be determined using a cross-cut according to DIN EN ISO 2409: 2013-06 (Paints and varnishes—Cross-cut test (ISO 2409:2013), German version of EN ISO 2409:2013, issue date: 2013 June).

In particular, the inventors have found that the polymer molecules in the form of anionic polymer molecules contained in the at least one anionically functionalized primer layer adheres particularly well to the flowable or plastically deformable, mineral construction material mixture or to the dimensionally stable, mineral green body obtained by at least partially solidifying the mineral construction material mixture.

In this connection, it is preferably assumed that at the molecular level anionic functional group can form coordinate bonds with metal ions, in particular $Ca^{2+}$ ions, of the mineral construction material mixture, preferably in the presence of bound water.

Further preferably, the aqueous polymer dispersion, which is used to produce the anionically functionalized primer layer, has a pH of 6.5 or more, preferably 7.1 or more, preferably of 7.5 or more, preferably of 8.0 or more, further preferably of 8.5 or more, further preferably of 9.0 or more, further preferably of 9.5 or more, in each case measured at a temperature of 25° C. and a pressure of 1013 mbar.

Preferably, the aqueous polymer dispersion of the at least one anionically functionalized primer layer contains at least one polymer having at least one free, anionic, functional group which is preferably selected from the group which consists of carboxylate, sulfonate, sulfate, phosphonate, phosphate and combinations thereof, preferably carboxylate, sulfonate and combinations thereof.

Preferably, the at least one anionically functionalized primer layer contains saponification-resistant polymers, which preferably do not have ester groups.

The saponification resistance of a polymer or polymer dispersion can be ascertained, for example, by determining the saponification value (SV), for example according to the method described in DIN EN ISO 3681:2007-10 ("Binders for paints and varnishes—Determination of saponification value—Titrimetric method (ISO 3681:1996)"; German version EN ISO 3681:1998, issue date 2007 October).

The at least one polymer, which has at least one free, anionic, functional group, is further preferably selected from the group which consists of anionically functionalized epoxide polymers and copolymers, anionically functionalized acrylic polymers and copolymers, anionically functionalized methacrylic polymers and copolymers, anionically functionalized polyurethane polymers and copolymers and mixtures thereof, preferably anionically functionalized acrylic polymers, anionically functionalized methacrylic polymers, anionically functionalized polyurethane polymers, copolymers thereof and mixtures thereof.

Anionically functionalized polymers and copolymers can be incorporated, for example via suitable chain extenders which have corresponding ionic groups, into the at least one polymer, in order to stabilize it as a particle dispersed in water.

A typical representative in the case of polyurethane polymers is for example dimethylolpropionic acid for carboxyl functionality and diol sulfonates for pendant sulfonic acid groups. The polymer obtained is preferably permanently hydrophilic and can further preferably be easily dispersed.

Likewise, anionic functionalized epoxy resins can for example be derived from one epoxy resin or several epoxy resins.

Anionic functionalized groups can be introduced into epoxy resin molecules by different methods. Typically, epoxy resins contain hydroxyl groups as well as epoxide groups. These groups can be reacted with various reagents, which contain the desired anionic functional group or a precursor thereof, for example by varying the ratio of dicarboxylic acid to the starting epoxy resin.

Another means of adding anionic functional groups to the epoxy resin consists of reacting the epoxy resin with a functionalizing agent which contains at least one anionic functional group or a precursor thereof and at least one functional group which is capable of reacting with epoxide groups and/or hydroxyl groups, wherein the epoxy resin to be reacted preferably contains hydroxyl groups.

Non-exclusive examples of such functionalizing agents comprise compounds which have at least one sulfonate functionality and/or at least one carboxylate functionality as well as further preferably at least one aromatic hydroxyl functionality.

The alkali metal salts of hydroxybenzenesulfonic acid and hydroxybenzoic acid are representative compounds of this type.

Alternatively, the starting epoxy resin can be derived by reaction with phosphorylating, sulfating and/or sulfonating reagents such as superphosphoric acid, sulfuric acid and the like.

Polyacrylates and polymethacrylates preferably have free deprotonated carboxylate groups.

Suitable polymer dispersion are commercially available from DSM Coating Resins B.V. (Zwolle, NL), for example, under the type designation NeoCryl®, which are aqueous polyacrylate polymer and copolymer dispersions, and NeoRez®, which are aqueous polyurethane polymer and copolymer dispersions.

Preferably, the at least one anionically functionalized primer layer has a non-volatile content of from 5 wt.-% to 70 wt.-%, preferably 10 wt.-% to 50 wt.-%, in each case relative to the total weight of all constituents of the anionically functionalized primer layer.

Preferably, the at least one anionically functionalized primer layer has a residual moisture content of at most 5 wt.-%, in each case relative to the total weight of all constituents of the anionically functionalized primer layer.

Further preferably, the at least one anionically functionalized primer layer has a thickness of from 50 nm to 1000 µm, preferably from 1 µm to 100 µm, further preferably from 5 µm to 50 µm.

The abbreviation "wt.-%" used in the present patent application denotes the specification of content "percent by weight".

BRIEF DESCRIPTION OF THE DRAWINGS

In the following the invention is explained with reference to several embodiment examples utilizing the attached drawings by way of example.

DETAILED DESCRIPTION

A multilayer film 1, 1' to be used according to the invention has a carrier ply 10, 10' and a transfer ply 13, 13', which contains at least one decorative element, arranged on the carrier ply 10, 10', wherein the transfer ply 13, 13' has at least one anionically functionalized primer layer 15 on the side facing away from the carrier ply 10, 10'.

Preferably, the carrier ply 10, 10' comprises at least one carrier layer 11 made of preferably a polyester, for example a polylactide (PLA) or polyethylene terephthalate (PET), a polyolefin, for example polypropylene (PP) or polyethylene (PE), or a combination thereof, in particular made of PET.

Optionally, the carrier ply 10, 10' has at least one detachment layer on the rear side, which comprises or consists of at least one wax, preferably montan ester wax, at least one silicone, at least one polyurethane or a combination thereof, on the side facing away from the transfer ply 13, 13'.

Preferably, an arrangement of at least one detachment layer on the rear side of the carrier ply 10, 10' prevents the layers from adhering during the production of a multilayer film 1, 1' to be used according to the invention.

Further preferably, the at least one carrier layer 11 of the carrier ply 10, 10' has a layer thickness between 4 µm and 100 µm, preferably between 10 µm and 50 µm.

Optionally, the carrier ply 10, 10' can furthermore comprise at least one detachment layer 12, which is arranged on the side of the carrier ply 10, 10' facing the transfer ply 13, 13".

Preferably, the at least one detachment layer 12 can comprise at least one wax, preferably montan ester wax, at least one silicone, at least one polyurethane or a combination thereof.

Figure 6:
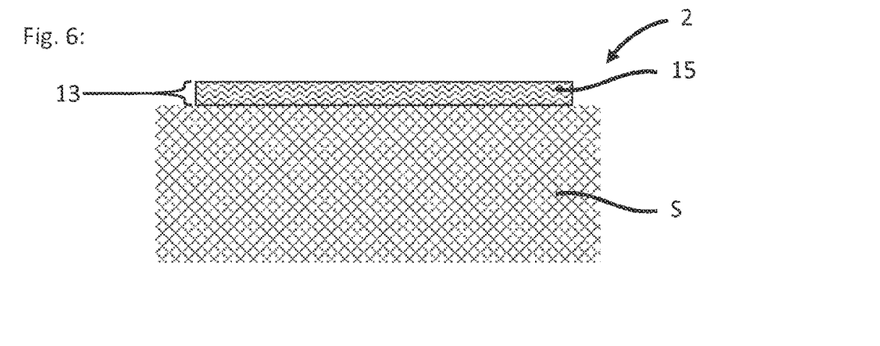
FIG. 6 and FIG. 7 show schematic representations of a decorated mineral composite body.
Figure 7:
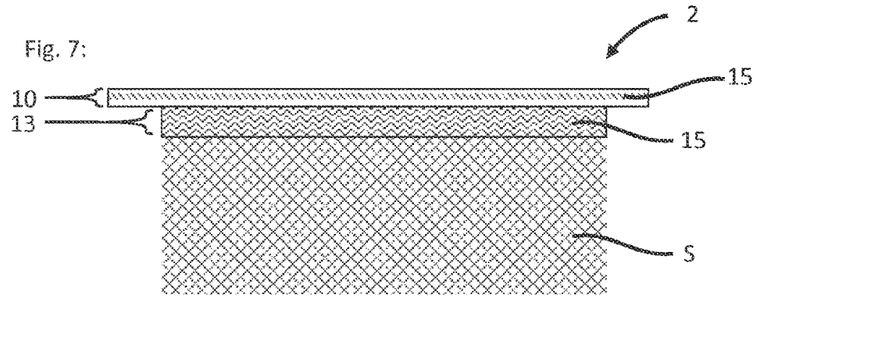

Further preferably, the at least one decorative element influences the surface texture, the color of the surface, the mechanical properties and/or the chemical properties of the decorated mineral composite body 2, wherein the at least one decorative element is preferably formed as a motif, as a decoration, for example individual image decoration or endless decoration, as a pattern, or a combination thereof.

In a preferred embodiment, at least one functional layer 14 is arranged between the at least one anionically functionalized primer layer 15 and the carrier ply 10, 10', wherein the at least one decorative element is preferably arranged in the at least one functional layer 14.

Preferably, the at least one functional layer 14 arranged between the at least one anionically functionalized primer layer 15 and the carrier ply 10, 10' comprises or consists of at least one metal and/or semi-metal, alloys thereof or mixture thereof, preferably aluminum, iron, chromium, indium, copper, tin, zinc, silicon, alloys thereof or mixtures thereof, at least one polymer, preferably selected from cellulose-based polymers, chlorinated polyolefins, chlorinated rubbers, colophony resins, epoxy resins, EVA copolymers, formaldehyde resins, hydrocarbon resins, ketone/aldehyde resins, maleinate resins, melamine resins, phenolic resins, acrylates, polyacrylates, polyacrylate dispersions, polyester dispersions, polyurethane dispersions, polyether dispersions, polyamide resins, polyester resins, polyisocyanates, polyolefin resins, polystyrene resins, polyurethane resins, polyvinyl acetals, polyvinyl acetates, polyvinyl alcohols, polyvinyl butyrals, polyvinyl chlorides, polyvinyl propionates, polyvinylpyrrolidones, polyvinylidene chlorides, polyvinylidene fluorides, shellacs, silicone resins, styrene acrylate dispersions, sulfonamide resins, urea resins, acrylonitrile-1,3-butadiene-styrene (ABS) resins and mixtures thereof.

The at least one functional layer 14 arranged between the at least one anionically functionalized primer layer 15 and the carrier ply 10, 10' can preferably furthermore comprise at least one additive which is preferably selected from the group which consists of hydrophobing agents, flow additives, defoamers, colorants, preferably selected from dyes, organic pigments, inorganic pigments and mixtures thereof, fillers, rheology additives, plasticizers, stabilizers, light stabilizers, antioxidants, flame retardants, reinforcing substances and mixtures thereof.

The at least one functional layer 14 arranged between the at least one anionically functionalized primer layer 15 and the carrier ply 10, 10' is further preferably selected from the group which consists of transparent and/or colored varnish layers, in particular comprising one or more dyes and/or pigments, replication layers with a molded optically active surface structure, reflective layers, in particular opaque reflective layers, transparent reflective layers, metallic reflective layers or dielectric reflective layers, optically variable layers, optically active layers, interference multilayer systems, volume hologram layers, liquid crystal layers, in particular cholesteric liquid crystal layers, electrically conductive layers, antenna layers, electrode layers, magnetic layers, magnetic storage layers, barrier layers and combinations thereof.

Preferably, a protective ply 18 can be arranged on the side of the at least one anionically functionalized primer layer 15 facing away from the carrier ply 10, 10'. The protective ply 18 preferably prevents damage and/or contamination of the primer layer 15, for example during the transport of a transfer film 1 to be used according to the invention, and can be peeled off the primer layer 15 before use of the transfer film 1, preferably, in alternative I), before the at least one anionically functionalized primer layer 15 is brought into contact, at least partially, with the flowable or plastically deformable, mineral construction material mixture, and/or, in alternative II), before the at least one multilayer film 1, 1' is arranged, in and/or after step c), with the at least one anionically functionalized primer layer 15 at least partially on the dimensionally stable, mineral green body 3a.

Preferably, the protective ply 18 comprises at least one carrier layer 19a made of preferably a polyester, a polyolefin, a polyurethane or a combination thereof, in particular made of PET.

In an alternative embodiment, the protective ply 18 can be an in particular self-supporting varnish layer. The varnish layer is for example made of polyurethane with a thickness between 10 μm and 250 μm and can be peeled off the primer layer 15 before use of the transfer film 1.

In an alternative embodiment, the protective ply 18 can be an in particular non-self-supporting varnish layer. The varnish layer has binding agents for example based on polyester and/or on maleinate resins and/or on polycarbonates and has a thickness between 0.1 μm and 5 μm, preferably 0.5 μm and 2 μm, and can remain on the primer layer 15 during the use of the transfer film 1 and in particular at least partially dissolves when the primer layer 15 is brought into contact with the still flowable construction material mixture.

Further preferably, the at least one carrier layer 10a of the protective ply 18 has a layer thickness between 4 μm and 100 μm, preferably between 10 μm and 50 μm.

Optionally, the protective ply 18 can furthermore comprise at least one detachment layer 19b, which is arranged on the side of the protective ply 18 facing the primer layer 15.

Preferably, the at least one detachment layer 19b can comprise at least one wax, preferably montan ester wax, at least one silicone, at least one polyurethane or a combination thereof.

Figure 1:
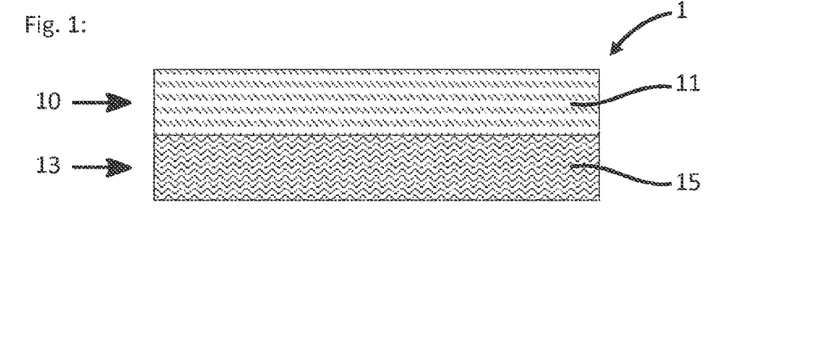
FIG. 1 to FIG. 4 show schematic representations of a transfer film.
Figure 2:
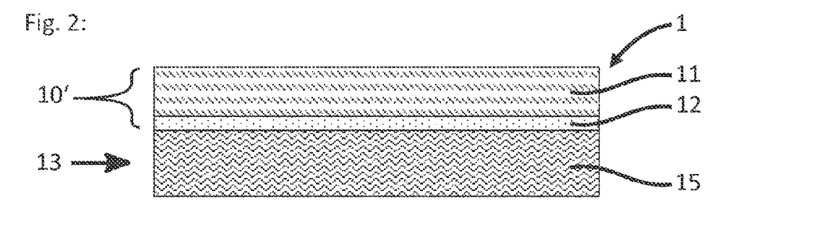
Figure 3:
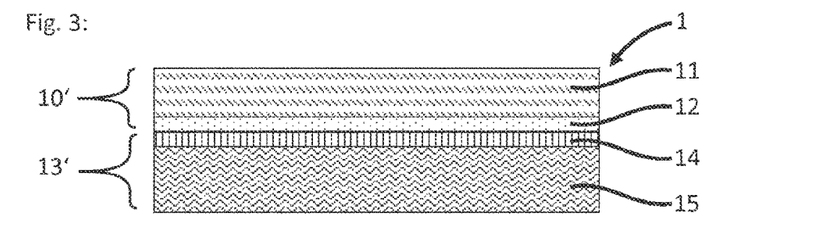
Figure 4:
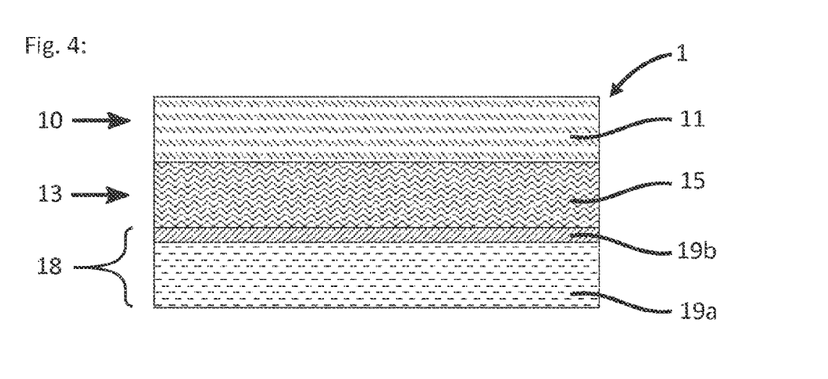
Figure 5:
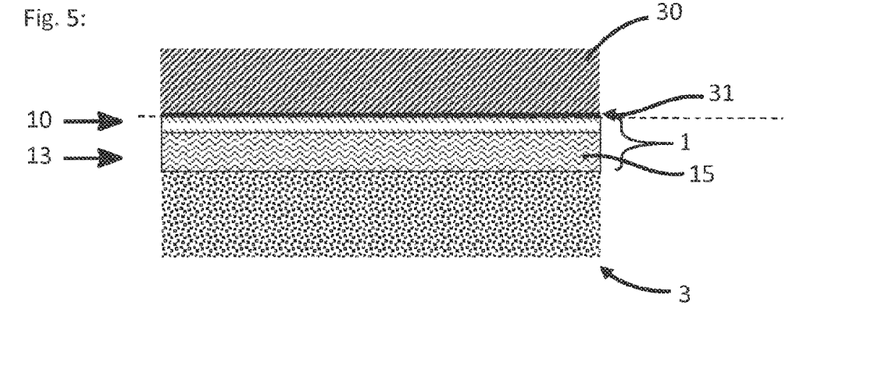
FIG. 5 schematically shows the arrangement of a transfer film in a forming element.

The method according to the invention for producing a decorated mineral composite body 2 using at least one multilayer film 1, 1' comprises the following steps:
 a) providing at least one forming element 30, preferably formwork, with at least one outer surface and at least one inner surface 31,
 b) applying a flowable or plastically deformable, mineral construction material mixture, which comprises water and at least one mineral binding agent, to the at least one inner surface 31 of the forming element 30, preferably formwork,
 c) at least partially solidifying the mineral construction material mixture to obtain a dimensionally stable, mineral green body 3a, and
 d) at least partially hardening the mineral construction material mixture to obtain a mineral composite body 2,
 wherein the multilayer film 1, 1' has a carrier ply 10, 10' and a transfer ply 13, 13', which contains at least one decorative element, arranged on the carrier ply 10, 10',
  wherein the transfer ply 13, 13' has at least one anionically functionalized primer layer 15 on the side facing away from the carrier ply 10, 10', and
  wherein I), before step b), the at least one multilayer film 1, 1' is arranged with the side of the carrier ply 10, 10' facing away from the at least one anionically functionalized primer layer 15 on the at least one inner surface 31 of the provided forming element 30, preferably formwork, with the result that the at least one anionically functionalized primer layer 15 of the multilayer film 1, 1' preferably points away from the at least one inner surface 31 of the forming element 30, preferably formwork, and wherein, in step b), the at least one anionically functionalized primer layer 15 is brought into contact, at least partially, with the flowable or plastically deformable, mineral construction material mixture, wherein, in step c), a decorated, dimensionally stable, mineral green body 3 is obtained, and/or
 wherein II), in and/or after step c), the at least one multilayer film 1, 1' is arranged with the at least one anionically functionalized primer layer 15 on the dimensionally stable, mineral green body 3a, wherein a decorated, dimensionally stable, mineral green body 3 is obtained, and
 wherein, in alternatives I) and II), a decorated mineral composite body 2 is obtained after step d).

The at least one forming element 30 used in the method according to the invention comprises at least one outer surface and at least one inner surface 30, wherein the at least one inner surface 31 of the forming element 30 can preferably have a two-dimensional or three-dimensional geometric shape. The inner surface 31 of the forming element 30 can alternatively or additionally also have a structuring in the form of a macroscopic and/or microscopic structure.

Preferably, the at least one multilayer film 1, 1' to be used according to the invention can be at least partially decorated using at least one decorative roller or can contain at least one decorative pattern.

In the method according to the invention, a protective ply 18 optionally arranged on the side of the at least one anionically functionalized primer layer 15 facing away from the carrier ply 10, 10' is at least partially, preferably completely, removed, in alternative I), preferably before the at least one anionically functionalized primer layer 15 is brought into contact, at least partially, with the flowable or plastically deformable mineral construction material mixture, and/or, in alternative II), preferably before the at least one anionically functionalized primer layer 15 is arranged on the dimensionally stable, mineral green body 3a.

A decorated, dimensionally stable, mineral green body 3 preferably comprises an at least partially solidified mineral construction material mixture and at least one transfer ply 13, 13', which contains at least one decorative element, at least partially arranged on at least one surface of the green body 3, wherein the side of the transfer ply 13, 13' facing the green body 3 is formed by at least one anionically functionalized primer layer 15, which is joined to the green body 3 in at least a positive-locking manner. Optionally, at least one carrier ply 10, 10' is furthermore arranged on the at least one transfer ply 13, 13' on the side of the transfer ply 13, 13' facing away from the green body 3.

A decorated mineral composite body 2 according to the invention comprises a mineral substrate S and at least one transfer ply 13, 13', which contains at least one decorative element, at least partially arranged on at least one surface of the substrate S, wherein the side of the transfer ply 13, 13" facing the substrate S is formed by at least one anionically functionalized primer layer 15, which is joined to the substrate S in at least a positive-locking manner.

Preferably, the mineral substrate S of the decorated mineral composite body 2 according to the invention comprises or consists of at least one at least partially hardened mineral construction material which is selected from the group which consists of concrete, mortar, sand-lime brick, ceramic and combinations thereof.

Further preferably, at least one carrier ply 10, 10' is arranged on the at least one transfer ply 13, 13', wherein the at least one transfer ply 13, 13" and the at least one carrier ply 10, 10' form a multilayer film 1, 1', which is preferably formed as a laminating film.

A multilayer film 1, 1', which is preferably formed as a laminating film, can preferably be designed to be smaller than the at least one surface of the substrate S on which the transfer ply 13, 13', which contains at least one decorative element, is at least partially arranged, preferably bonded.

Alternatively, a multilayer film 1, 1', which is preferably formed as a laminating film, can be designed to be the same size as the at least one surface of the substrate S on which the transfer ply 13, 13', which contains at least one decorative element, is at least partially arranged, preferably bonded.

Alternatively, a multilayer film 1, 1', which is preferably formed as a laminating film, can be designed to be larger than the at least one surface of the substrate S on which the transfer ply 13, 13', which contains at least one decorative element, is at least partially arranged, preferably bonded, wherein the multilayer film 1, 1' further preferably forms an overhang at least at one edge of the decorated mineral composite body 2.

Preferably, the overhang of the multilayer film 1, 1' can, after arranging the multilayer film 1,1' on at least partial areas of the at least one surface of the decorated object, make it possible to join two or more composite bodies 2 decorated according to the invention through a joining manufacturing process, for example by crimping, folding and/or bending.

Preferably, the transfer ply 13, 13' and/or the transfer ply 10, 10' can be modified after application to the decorated mineral composite body 2, for example by at least partial application, preferably overprinting and/or dousing and/or flooding, of at least one further layer, for example protective layer and/or varnish layer, by printing and/or casting methods known to a person skilled in the art.

A multilayer film 1, 1' to be used according to the invention is preferably produced by sequential, preferably full-surface or partial, application of the individual layers of the transfer ply 13, 13' to the transfer ply 10, 10' by methods known in the state of the art, for example by printing methods such as gravure printing and/or screen printing and/or digital printing and/or flexographic printing and/or inkjet printing and/or offset printing, and/or by casting methods such as slot casting.

The layers produced with these methods are for example protective layers, barrier layers, decorative layers, adhesion-promoter layers, adhesive layers, detachment layers, color layers, which can be present in each case over the whole surface and/or partially.

Furthermore, the preferably full-surface or partial application of vapor-deposited and/or printed-on metal layers and/or metal oxide layers as decorative element or decorative layer is possible. Vapor-deposited metal and/or metal oxide layers can, for example, be applied by methods known in the state of the art, for example physical vapor deposition (PVD) or chemical vapor deposition (CVD).

The layers produced with these methods are for example reflective layers, conductive layers, barrier layers, decorative layers, which can be present in each case over the whole surface and/or partially.

Further preferably, after molding an optically active surface structure into a replication layer, at least one decorative layer is vapor-deposited, preferably in each case in areas or over the whole surface, on the replication layer.

The application over the whole surface followed by a removal of the at least one decorative layer in areas by means of known methods such as washing methods or lift-off varnishes or etching methods or mask exposure methods with the aid of a photoresist layer is also possible.

Preferably, the at least one anionically functionalized primer layer 15 of the transfer ply 13, 13' is first arranged on or applied to the transfer ply 10, 10', which can comprise at least one carrier layer made of a polyester, a polyolefin or a combination thereof, in particular made of PET, by at least one of the above-named printing and/or casting methods, wherein the at least one anionically functionalized primer layer 15 is further preferably applied with an application weight from a range of from 0.5 g/m$^2$ to 500 g/m$^2$, preferably from 1 g/m$^2$ to 50 g/m$^2$, preferably from 5 g/m$^2$ to 25 g/m$^2$, preferably from 9 g/m$^2$ to 15 g/m$^2$, in each case relative to the total weight of all constituents of the anionically functionalized primer layer 15.

Further preferably, the at least one anionically functionalized primer layer 15 is produced using an aqueous polymer dispersion, which a pH of 6.5 or more, preferably 7.1 or more, preferably of 7.5 or more, preferably of 8.0 or more, further preferably of 8.5 or more, further preferably of 9.0 or more, further preferably of 9.5 or more, in each case measured at a temperature of 25° C. and a pressure of 1013 mbar, on.

Example 1

A PET carrier (thickness of the PET carrier of from 5 μm to 150 μm, preferably from 7 μm to 100 μm) as carrier ply, coated with an at least 50 nm thick layer of a montan ester wax, was coated with an aqueous primer coat made of Neocryl A-45 (DSM Coating Resins B.V.) in a mixture of water and isopropanol, solids approx. 15%, typically with an application weight of 10 g/m$^2$.

The coating was dried to constant weight in a standard atmosphere (air temperature of 23° C. and a relative atmospheric humidity of 50%) according to DIN EN ISO 291: 2008-08 ("Plastics—Standard atmospheres for conditioning and testing (ISO 291:2008)"—German version EN ISO 291:2008, issue date: 2008 August) and formed a closed transfer ply of the transfer film.

In each case 50 g EB screed concrete from quick-mix Gruppe GmbH & Co. KG (Osnabrück, DE) was prepared with 6.5 g water. The transfer film was arranged with the transfer ply on a panel made of ABS material with a thickness of 1 mm and the prepared screed concrete was applied in each case to the transfer film on the side of the primer coat.

After the screed concrete had cured completely at room temperature, a mineral composite body formed which had been coated on one side with the transfer film used in each case. A very good adhesive tape strength was achieved after approx. 5 days' curing time.

The PET carrier was then detached from the concrete, wherein the transfer ply remained adhering to the concrete and formed a smooth coating on the composite body.

Figure 8:
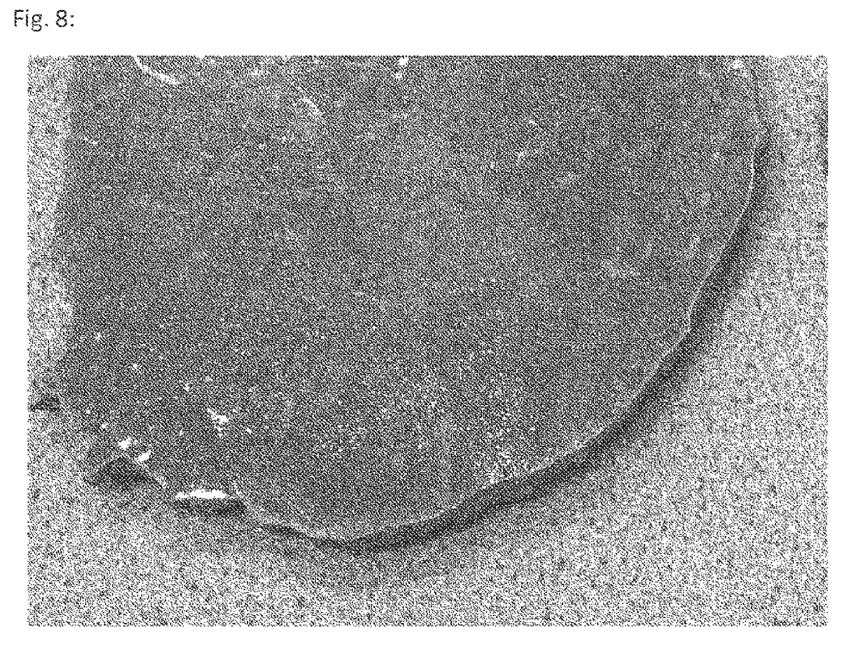
FIG. 8 shows a decorated mineral composite body produced in Example 1.

FIG. 8 depicts a produced composite body, wherein the upper side of the composite body has been formed by the transfer ply adhering to the concrete.

The adhesion of the transfer ply to the concrete was tested by means of a cross-cut according to DIN EN ISO 2409: 2013-06.

In each case 6 cuts were made vertically and 6 cuts were made horizontally (at an angle of 90° to the vertical cuts) in the coating as far as the substrate with the aid of a blade and preferably with the aid of a template. The width of the cut was dependent on the layer thickness of the coating. In the case of coatings with a layer thickness of less than 60 μm the distance between the cuts is preferably approximately 1 mm.

A clear adhesive tape or an adhesive crepe tape with an adhesiveness of from 6 N/25 mm to 10 N/25 mm was stuck to the resulting square of cuts (measurement area). This was peeled off in a time of from 0.5 to 1 second at an angle of 60°.

The evaluation was effected in accordance with DIN EN ISO 2409: 2013-06 by visual assessment of the measurement area and classification into cross-cut characteristic values of from 0 (very good adhesion) to 5 (very poor adhesion), abbreviated to GT 0 to GT 5, or in accordance with ASTM D 3359-09, test method B.

Figure 12:
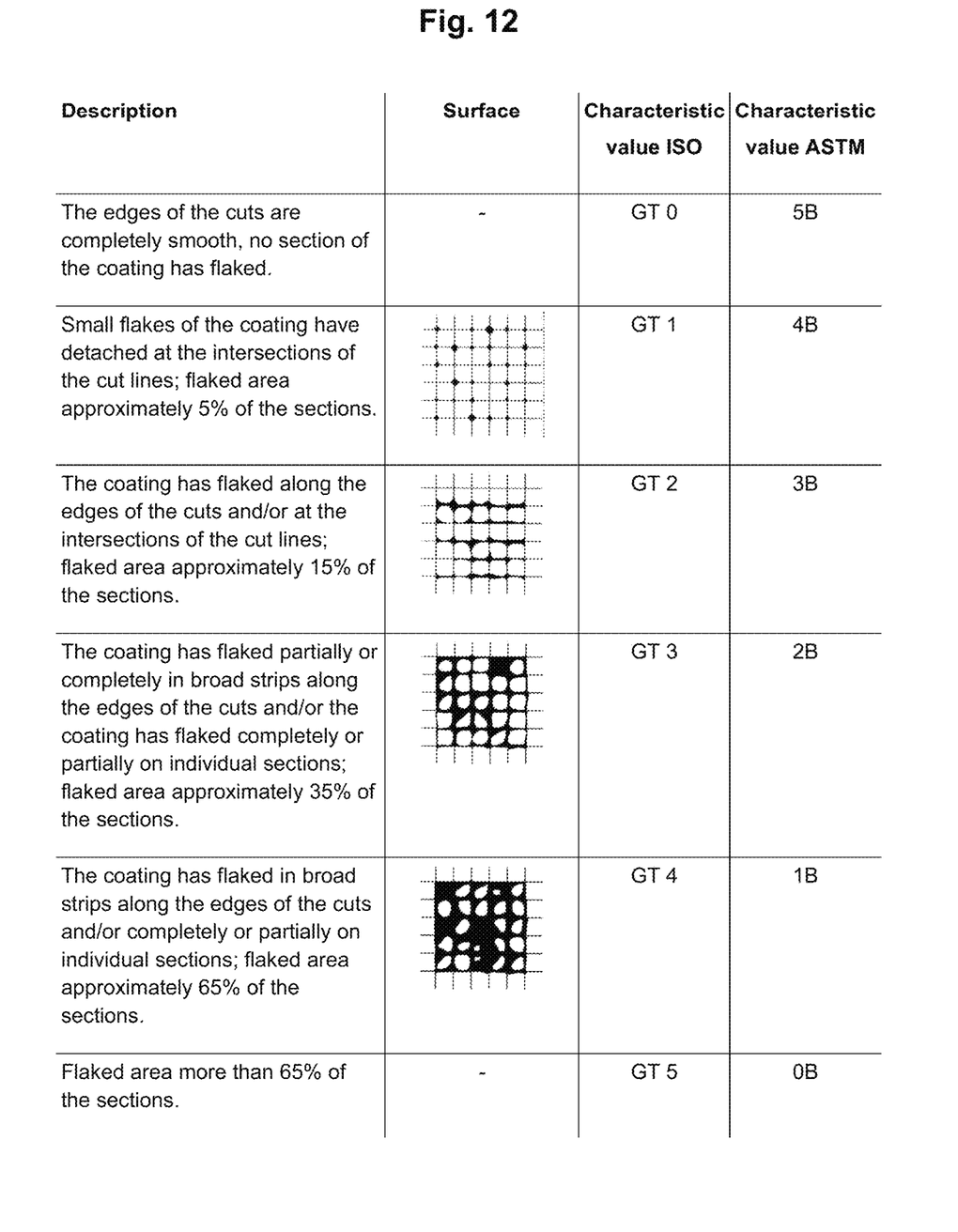
FIG. 12 shows a table summarizing the criteria for a classification of the corresponding characteristic values.

The criteria for a classification of the corresponding characteristic values are summarized in FIG. 12.

If the after a curing time of 28 days, cross-cut characteristic values between 5B and 4B were measured on the produced composite bodies.

For the assessment of the adhesion of the multilayer film and/or of the transfer ply of the multilayer film, a so-called adhesive tape test was also carried out. A self-adhesive adhesive strip (brand Tesa, type 4657) in particular with a length of 45 mm and a width of 25 mm was stuck in the middle to a solidified construction material mixture coated with the multilayer film and/or the transfer ply of the multilayer film free from wrinkles and bubbles and pressed on manually.

The solidified and coated construction material mixture was clamped in a Z005 material testing machines from ZwickRoell GmbH & Co. KG (Ulm, DE). At a peel angle of 90°, the adhesive strip was peeled off at a speed of 500 mm/min and in the process the force which was necessary in order to detach the adhesive strip from the multilayer film and/or the transfer ply of the multilayer film was measured.

The tests surprisingly showed that the multilayer film and/or the transfer ply of the multilayer film remained substantially completely on the solidified construction material mixture and only the adhesive strip was peeled off again. The force measured in the process was between 400 cN and 1000 cN.

The adhesiveness between the multilayer film and/or the transfer ply of the multilayer film and the solidified construction material mixture should accordingly be higher than this measured adhesiveness as, after the adhesive strip had been detached from the multilayer film and/or the transfer ply under this measured adhesiveness, still no defects occurred on the multilayer film and/or the transfer ply of the multilayer film.

Figure 9:
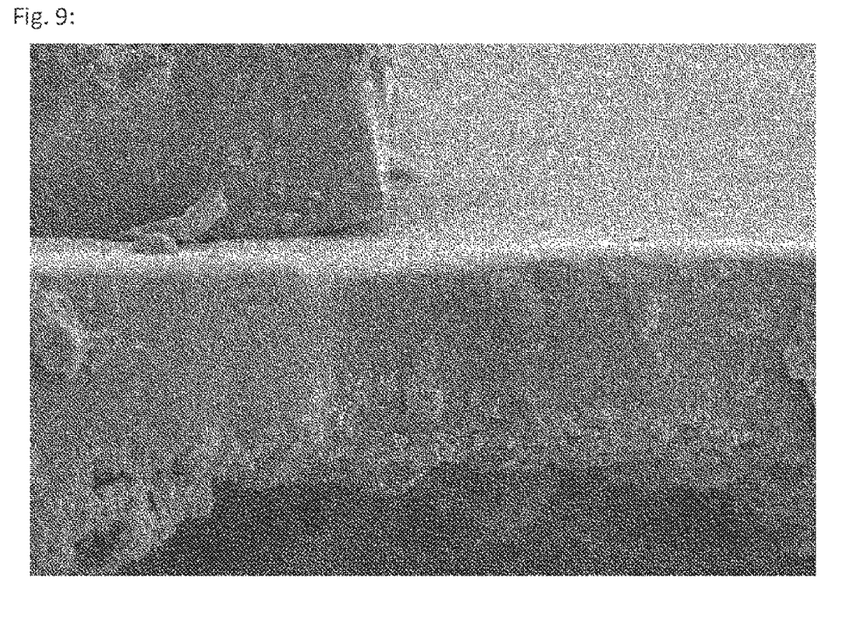
FIG. 9 and FIG. 10 show SEM micrographs of the detached transfer ply of the composite body produced in Example 1.
Figure 10:
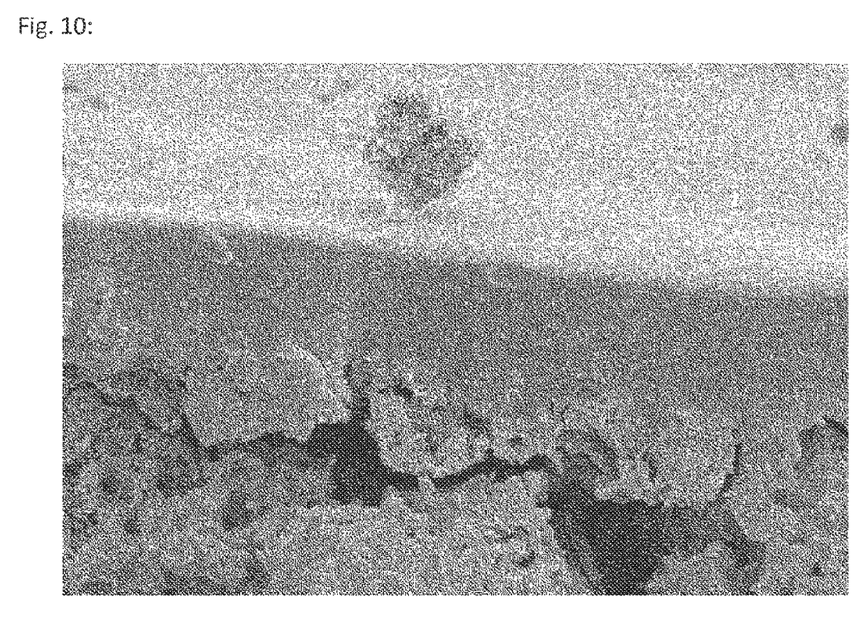

Furthermore, SEM micrographs of parts of the composite bodies were produced, and are represented in FIG. 9 and FIG. 10.

For the SEM micrographs, in each case an approx. 10×10×5 mm (10×10 mm base area, thickness 5 mm) test piece was broken off the coated composite body to be examined and coated with gold by sputtering.

In the SEM micrographs, in each case the break-off edges of the test piece were examined.

The SEM micrographs were in each case recorded with the following parameters: 8 kV voltage, 20 mm distance between the test pieces, spot size 39, observation angle 80°.

As can easily be seen in FIG. 9 and FIG. 10, the polymer layer of the transfer ply had a strong adhesion to the concrete. At some tearing edges/breaking edges a thin layer of concrete clearly remained adhering to the polymer. It was furthermore evident that the concrete was mechanically "anchored" in the polymer layer. It was evident in particular that the polymer layer formed a closed and smooth surface which seals the concrete.

Comparison Example 2

In order to test what influence the transfer ply has on the stability and adhesiveness of the transfer ply, 50 g EB screed concrete was prepared with water as described above and the moist mixture was put on a panel made of ABS material with a thickness of 1 mm as substrate. The surface of the mixture lying opposite the ABS panel was smoothed out and coated with an aqueous primer coat made of Neocryl A-45 in a mixture of water and isopropanol, solids approx. 15%, by means of brushing.

In order to obtain a coating that is as complete as possible, a much higher application weight was necessary.

After the coated concrete mixture had dried out, as specified above in Example 1, the test piece obtained was examined visually.

Figure 11:
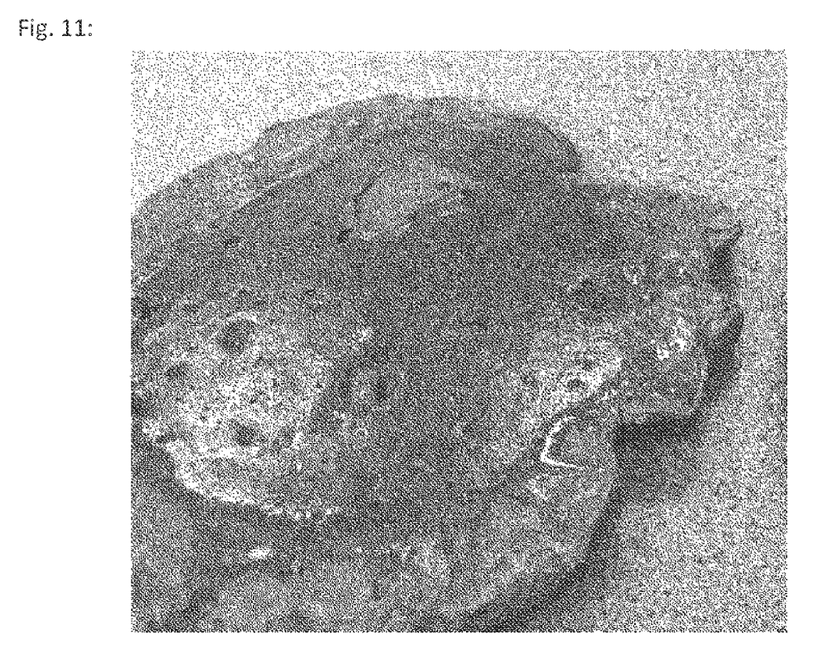
FIG. 11 shows a composite body produced in Comparison Example 2.

In spite of the higher application weight of the coating, a closed film did not form on the coated surface after the concrete had dried out, as can be seen in FIG. 11.

LIST OF REFERENCE NUMBERS

1, 1' multilayer film
2 decorated mineral composite body
3 decorated, dimensionally stable, mineral green body
3a dimensionally stable, mineral green body
10, 10' carrier ply
11 carrier layer
12 detachment layer
13, 13' transfer ply
14 functional layer
15 anionically functionalized primer layer
18 protective ply
19a carrier layer
19b detachment layer
30 forming element
31 inner surface
S mineral substrate

The invention claimed is:

1. A method for producing a decorated mineral composite body using at least one multilayer film, wherein the method comprises the following steps:
   a) providing at least one forming element with at least one outer surface and at least one inner surface,
   b) applying a flowable or plastically deformable, mineral construction material mixture, which comprises water and at least one mineral binding agent, to the at least one inner surface of the forming element,
   c) increasing the viscosity of the mineral construction material mixture to obtain a dimensionally stable, mineral green body, and
   d) increasing the hardness of the mineral construction material mixture,
   wherein the multilayer film has a carrier ply and a transfer ply, which contains at least one decorative element, arranged on the carrier ply,
   wherein the transfer ply has at least one anionically functionalized primer layer on the side facing away from the carrier ply, and
   wherein the at least one anionically functionalized primer layer contains at least one polymer having at least one free, anionic, functional group, and
   wherein I), before step b), the at least one multilayer film is arranged with the side of the carrier ply facing away from the at least one anionically functionalized primer layer on the at least one inner surface of the provided forming element, and, in step b), the at least one anionically functionalized primer layer is brought into contact with the flowable or plastically deformable, mineral construction material mixture, wherein, in step c), the decorated, dimensionally stable, mineral green body is obtained, and/or
- wherein II), in and/or after step c), the at least one multilayer film is arranged with the at least one anionically functionalized primer layer on the dimensionally stable, mineral green body, wherein the decorated, dimensionally stable, mineral green body is obtained, and
- wherein, in alternatives I) and II), the decorated mineral composite body is obtained after step d).

2. The method according to claim 1, wherein the at least one mineral binding agent is selected from the group which consists of calcium silicate hydrates, cement, lime, clay, gypsum, loam, magnesia binder and combinations thereof.

3. The method according to claim 1, wherein the mineral construction material mixture comprises or consists of concrete, mortar, sand-lime brick, silicate ceramic or a combination thereof.

4. The method according to claim 1, wherein the mineral construction material mixture comprises or consists of concrete or mortar, wherein the at least one mineral binding agent comprises or consists of cement, and wherein the mineral construction material mixture furthermore comprises aggregate.

5. The method according to claim 1, wherein the mineral construction material mixture comprises or consists of sand-lime brick or autoclaved aerated concrete, wherein the at least one mineral binding agent comprises or consists of a calcium silicate hydrate,
- wherein, in step d), the decorated, dimensionally stable, mineral green body is hydrothermally hardened, to obtain the decorated mineral composite body.

6. The method according to claim 1, wherein the mineral construction material mixture comprises or consists of a silicate ceramic, wherein the at least one mineral binding agent comprises or consists of a clay mineral
- wherein, in step c), the dimensionally stable, mineral green body is obtained by means of pressing, slip casting, injection molding, film casting, modeling and/or extruding, and
- wherein, in step d), the decorated, dimensionally stable, mineral green body is fired to obtain the decorated mineral composite body.

7. The method according to claim 6, wherein the at least one multilayer film comprises at least one fireproof decorative element.

8. The method according to claim 1, wherein the carrier ply comprises at least one carrier layer made of a polyester, a polyolefin or a combination thereof.

9. The method according to claim 8, wherein the at least one carrier layer of the carrier ply has a layer thickness between 4 μm and 100 μm.

10. The method according to claim 1, wherein the carrier ply furthermore comprises at least one detachment layer, which is arranged on the side of the carrier ply facing the transfer ply.

11. The method according to claim 10, wherein the at least one detachment layer comprises at least one wax at least one silicone, at least one polyurethane or a combination thereof.

12. The method according to claim 1, wherein the at least one anionically functionalized primer layer has a residual moisture content of at most 5 wt.-%, in each case relative to the total weight of all constituents of the primer layer.

13. The method according to claim 1, wherein the at least one polymer having at least one free, anionic, functional group is selected from the group which consists of carboxylate, sulfonate, sulfate, phosphonate, phosphate and combinations thereof.

14. The method according to claim 13, wherein the at least one polymer which has at least one free, anionic, functional group is selected from the group which consists of anionically functionalized epoxide polymers and copolymers, anionically functionalized acrylic polymers and copolymers, anionically functionalized methacrylic polymers and copolymers, anionically functionalized polyurethane polymers and copolymers and mixtures thereof.

15. The method according to claim 1, wherein the at least one decorative element influences the surface texture, the color of the surface, the mechanical properties and/or the chemical properties of the decorated mineral composite body.

16. The method according to claim 1, wherein at least one functional layer is arranged between the at least one anionically functionalized primer layer and the carrier ply.

17. The method according to claim 16, wherein the at least one functional layer arranged between the at least one anionically functionalized primer layer and the carrier ply comprises or consists of at least one metal and/or semi-metal, alloys thereof or mixture thereof, at least one polymer, selected from cellulose-based polymers, chlorinated polyolefins, chlorinated rubbers, colophony resins, epoxy resins, EVA copolymers, formaldehyde resins, hydrocarbon resins, ketone/aldehyde resins, maleinate resins, melamine resins, phenolic resins, polyacrylates, polyacrylate dispersions, polyester dispersions, polyurethane dispersions, polyether dispersions, polyamide resins, polyester resins, polyisocyanates, polyolefin resins, polystyrene resins, polyurethane resins, polyvinyl acetals, polyvinyl acetates, polyvinyl alcohols, polyvinyl butyrals, polyvinyl chlorides, polyvinyl propionates, polyvinylpyrrolidones, polyvinylidene chlorides, polyvinylidene fluorides, shellacs, silicone resins, styrene acrylate dispersions, sulfonamide resins, urea resins, acrylonitrile-1,3-butadiene-styrene (ABS) resins and mixtures thereof.

18. The method according to claim 16, wherein the at least one functional layer arranged between the at least one anionically functionalized primer layer and the carrier ply is selected from the group which consists of transparent and/or colored varnish layers, replication layers with a molded optically active surface structure, reflective layers, optically variable layers, optically active layers, interference multilayer systems, volume hologram layers, liquid crystal layers, electrically conductive layers, antenna layers, electrode layers, magnetic layers, magnetic storage layers, barrier layers and combinations thereof.

* * * * *